United States Patent [19]

Kostandov et al.

[11] 4,241,112

[45] Dec. 23, 1980

[54] METHOD FOR APPLYING POLYMER COATING COMPOSITION

[76] Inventors: Leonid A. Kostandov, Vorobievskoe shosse, 6, kv. 4; Nikolai S. Enikolopov, Kutuzovsky prospekt 26, kv. 245; Fridrikh S. Dyachkovsky, Vorobievskoe shosse, 2-b, kv. 9; Ljudmila A. Novokshonova, ulitsa 26 Bakinskikh Komissarov, 7, korpus 4, kv. 38; Jury A. Gavrilov, Chistoprudny bulvar, 14, kv. 57, all of Moscow; Olga I. Kudinova, poselok Kratovo, ulitsa Malakhovskaya, 15, Moskovskaya oblast; Tatyana A. Maklakova, Leningradskoe shosse, 8/2, kv. 200, Moscow; Leonid A. Akopian, Mytischi, ulitsa Tereshkovoi, 11, kv. 21; Khaim-Mordkhe A. Brikenshtein, Noginsky raion, Chernogolovka, ulitsa Vtoraya, 5, kv. 2, both of Moskovskaya oblast, all of U.S.S.R.

[21] Appl. No.: 931,921

[22] Filed: Aug. 8, 1978

[51] Int. Cl.$^2$ .............................................. B05D 7/24
[52] U.S. Cl. ........................ 427/213; 106/308 B; 260/42.14; 260/42.15; 427/214; 427/215; 427/255; 427/301; 427/302; 526/97; 526/129; 526/156; 526/901; 427/385.5; 427/389.7; 427/389.8; 427/248.1
[58] Field of Search ................ 526/97, 129, 156, 901; 427/213, 214, 215, 221, 301, 302, 248 H, 255, 385 R, 385 A, 390 A, 390 R; 260/42.14, 42.15; 106/308 B

[56] References Cited

U.S. PATENT DOCUMENTS

| | | |
|---|---|---|
| 3,168,484 | 2/1965 | Engel et al. .................. 526/156 X |
| 3,790,550 | 2/1974 | Miller ............................ 526/156 X |
| 3,925,338 | 12/1975 | Ort .................................. 526/156 X |
| 4,035,560 | 7/1977 | Caumartin et al. ................. 526/124 |
| 4,076,922 | 2/1978 | Satoh et al. .......................... 526/97 |

*Primary Examiner*—John D. Smith
*Assistant Examiner*—Thurman K. Page
*Attorney, Agent, or Firm*—Fleit & Jacobson

[57] ABSTRACT

According to the invention, the method for applying a polymer coating onto the surface of a solid filler comprises deposition of a complex organometallic catalyst, containing a compound of a transition metal and an organic compound of a metal of the second or third groups of the periodic system, on the surface of the solid filler and liquid- or gas-phase polymerization of olefins at a temperature of 50° to 170° C. and a pressure of 1 to 60 atm on said catalyst deposited on the surface of the solid filler. The deposition is carried out in two stages. The first stage is gas-phase deposition of the first component of the catalyst, i.e. a compound of a transition metal, on the surface of the solid filler. The second stage is gas- or liquid-phase deposition of the second component of the catalyst, i.e. an organic compound of a metal of the second or third group of the periodic system. Polymer coatings produced by this method are marked by a high quality and uniformity, as well as good adhesion to the surface of the solid filler. The coating density is 0.7 to 0.95 g/cm$^3$. The thickness of such coatings can be varied within a broad range from a minimum of $7 \cdot 10^{-3}$ g/m$^2$. The method according to the invention permits a considerable reduction in the consumption of the initial monomers and the catalyst; for example, the catalyst consumption can be reduced to a value as low as 0.001 to 0.1 percent of the weight of the filler on conversion to vanadium tetrachloride. The method is quite simple technologically.

10 Claims, No Drawings

METHOD FOR APPLYING POLYMER COATING COMPOSITION

FIELD OF THE INVENTION

The present invention relates to the production of composite materials and, more particularly, to methods for applying polymer coatings onto the surfaces of solid fillers. The invention is applicable to the production of plastics.

BACKGROUND OF THE INVENTION

There is known a method for applying a polymer coating onto the surface of a solid filler by wetting the surface of the filler, for example, clay, with a solution of a monomer, such as styrene, acrylic acid or its derivatives, and a radical polymerization initiator, whereupon radiation or thermal polymerization is carried out.

However, the above method does not make it possible to produce polyolefin-based polymer coatings.

There is further known a method for applying a polymer coating onto the surface of a solid filler by polymerizing ethylene on a catalyst deposited on the surface of the filler. The catalyst is a complex organometallic catalyst comprising a compound of a transition metal and an organoaluminium. According to this method, a solid filler, for example, cellulose, and a solvent, for example, n-heptane, are placed in a reaction vessel, and azeotropic drying of the mixture is carried out. This is followed by liquid-phase deposition on the surface of the filler of the first component of the catalyst, i.e. a compound of a transition metal, for example, vanadium tetrachloride, for which purpose said first catalyst component is added to the mixture. As a result, some part of said catalyst component is deposited on the surface of the filler, while the rest of this component remains undeposited in the solvent. Ethylene is then introduced into the reaction vessel to reduce the vanadium tetrachloride to vanadium trichloride, the reduction taking place both on the surface of the filler and in the solvent. The second component of the catalyst, i.e. an organoaluminium, for example, triethyl aluminium, and ethylene are then introduced into the reaction vessel, which is followed by polymerization of ethylene both on the catalyst deposited on the surface of the filler and on the catalyst which remains free in the solvent. The polymerization is carried out at a temperature of up to 90° C. and atmospheric pressure. The polymerizate thus produced is washed from the remainder of the catalyst and dried.

The process under review yields a mixture containing the end product, i.e. the filler with the polymer coating applied thereto, and a considerable amount of the ballast product, i.e. the free polymer. The presence of the free polymer in the mixture narrows down the field of application of the method under review and affects the quality of articles manufactured from such a mixture, its adverse effects including a reduced mechanical strength and increased flammability of articles. The presence of the free polymer in the mixture also accounts for an unnecessarily great consumption of the initial monomer and catalyst; for example, the catalyst comsumption amounts to 0.4 to 4 percent of the weight of the filler on conversion to vanadium tetrachloride. Despite all the above disadvantages, it is impossible to reduce the free polymer content in the mixture, to say nothing of a complete removal of the free polymer from the mixture.

The method under review is further disadvantageous in that it is hard to adjust the thickness of the polymer coating on the filler's surface. Furthermore, the polymer applied to the surface of the filler tends to peel off that surface; the greater the thickness of the polymer coating, the more this effect is pronounced.

Finally, the method under review makes it necessary to wash the end product from the remainder of the catalyst.

SUMMARY OF THE INVENTION

It is an object of the present invention to provide a method for applying a polymer coating onto the surface of a solid filler, which would make it possible to produce polymer coatings of a high quality and variable thickness.

It is another object of the invention to provide a method for applying polymer coatings, which would rule out the formation of free polymers and thus find numerous applications.

It is still another object of the invention to provide a method for applying polymer coatings, which would make it possible to substantially reduce the consumption of initial monomers and catalysts.

It is yet another object of the invention to provide a method for applying polymer coatings, which would dispense with the operation of washing the end product from the remainder of the catalyst.

The foregoing and other objects of the present invention are attained by providing a method for applying a polymer coating onto the surface of a solid filler, comprising a deposition on the surface of said filler of a complex organometallic catalyst consisting of a compound of a transition metal and an organic compound of a metal of the second or third groups of the periodic system, the deposition being carried out in two stages, whereof the first is the deposition of the first of said catalyst components, while the second stage is the deposition of the second of said catalyst components, which also includes polymerization of olefins on said catalyst deposited on the surface of said filler, the method being characterized, according to the invention, in that the deposition of the first component of the catalyst, i.e. a compound of a transition metal, is gas-phase deposition, whereas the deposition of the second component of the catalyst, i.e. an organic compound of a metal of the second or third groups of the periodic system, is gas- or liquid-phase deposition, and in that the polymerization of olefins is gas- or liquid-phase polymerization carried out at a temperature of 50° to 170° C. and a pressure of 1 to 60 atm.

The components of the catalyst may be deposited in the above-mentioned order on the surface of the filler prior to carrying out the process of polymerization.

The first component of the catalyst, i.e. a compound of a transition metal, may be deposited on the surface of the filler before the polymerization process, in which case the deposition of the second component of the catalyst, i.e. an organic compound of a metal of the second or third groups of the periodic system, is carried out simultaneously with the process of polymerization.

The method according to the invention makes it possible to produce high-quality uniform coatings featuring good bonding to the surface of the filler, a density of 0.7 to 0.95 g/cm$^3$ and a thickness which may be adjusted within a broad range from a minimum of $7 \cdot 10^{-3}$ g/m$^2$. The method rules out the formation of the ballast product, i.e. a free polymer, which, in turn, makes the end product, i.e. the filler with a polymer coating applied thereto, fit for the manufacture of articles with better characteristics, such as an increased mechanical strength and reduced flammability. The method according to the invention makes it possible to considerably curtail the consumption of initial monomers and the catalyst; for example, the catalyst consumption is cut down to 0.001 to 0.1 percent of the weight of the filler on conversion to vanadium tetrachloride. The method is technologically simple and dispenses with the operation of washing the end product from the remainder of the catalyst.

The method according to the invention can be carried out as both a continuous and batch process.

DETAILED DESCRIPTION OF THE INVENTION

According to the proposed method, the initial olefins may be ethylene, propylene, butene and methylpentene. One can use both individual olefins and different combinations thereof.

the filler may be a bulk material, such as sand, chalk, talcum, kaolin, aluminum oxide, expanded perlite, graphite, glass beads, metal powders, oxides and salts of metals, and sawdust with grain sizes of a few hundredths of a micron to several centimeters; the filler may be a fibrous materials, such as fiber glass, asbestos and cellulose fiber; it may be a sheet material, such as sheet metal; other solid bodies of different shapes and sizes can be used as a filler.

According to the invention, the method for applying polymer coatings is effected as follows.

If necessary, the filler is dried at a temperature of 100° to 200° C. during 1 to 3 hours before it is placed in a reaction vessel. The latter is blown with an inert gas or evacuated in advance. A complex organometallic catalyst, comprising a compound of a transition metal and an organic compound of a metal of the second or third groups of the periodic system, is then deposited on the surface of the filler. First, the transition metal compound is deposited, which may be, for example, vanadium tetrachloride, vanadium oxytrichloride, titanium tetrachloride, tungsten hexachloride, and iron trichloride. Vanadium tetrachloride, vanadium oxytrichloride and titanium tetrachloride, which are liquid under normal conditions, are deposited as follows. Vapor of one of the above compound is introduced into a reaction vessel containing a filler with a flow of an inert carrier gas or under vacuum. The result is a vapor deposition of the transition metal on the surface of the filler. If the filler is a dispersed material it is desirable that it should be stirred at this stage. The stirring is effected with the use of vibration boiling, gravity, a fluidized bed, as well as mechanical, vibrator or pneumatic means. Upon its deposition on the surface of the filler, the transition metal compound adheres to that surface due to a chemical reaction of that compound with functional surface groups of the filler, such as hydroxyl groups, as well as reduction of the transition metal compound, whereby it becomes solid phase. Depending on the type of filler and the transition metal compound, the reduction of the transition metal compound deposited on the surface of the filler can be effected in two ways. The first is thermal reduction. The second way is the use of a reducing agent, such as ethylene or vapor of an organic compound of a metal of the second or third groups of the periodic system, which organic compound is the second component of the catalyst used in the process. In the latter case, the fixation of the first catalyst component on the surface of the filler is accompanied by a deposition of the second component of the catalyst, which makes it unnecessary to repeat the operation of depositing the second component of the catalyst on the surface of the filler.

Such transition metal compounds as iron trichloride and tungsten hexachloride, which are solid under normal conditions, are deposited on the filler surface by sublimation.

The amount of the transition metal compound deposited on the surface of the filler is 0.001 to 0.1 percent of the weight of the filler.

The deposition of the first catalyst component on the surface of the filler is followed by depositing the second catalyst component, which is an organic compound of a metal of the second or third groups of the periodic system, such as diethyl aluminium chloride, triethyl aluminium, triisobutyl aluminium, diethyl zinc, and diethyl magnesium. The deposition of the second component of the catalyst may be effected prior to or simultaneously with the process of polymerization. The deposition is gas- or liquid-phase deposition, depending on the phase of polymerization.

In the case of gas-phase deposition of the second component of the catalyst, carried out prior to gas-phase polymerization, the filler with the transition metal compound deposited on its surface is placed in a reaction vessel where vapor of the organometallic compound is introduced in a flow of an inert gas. If a dispersed filler is used, the deposition should be accompanied by stirring which is carried out as described above for the case of a transition metal compound deposition.

If, as pointed out above, the second component of the catalyst is used to reduce the first component, it is unnecessary to perform a special operation of depositing the second component of the catalyst on the surface of the filler.

At this point the filler with the components of the complex organometallic catalyst deposited on its surface is placed in a polymerization reactor where gas-phase polymerization of olefins on this catalyst is carried out at a temperature of 50° to 170° C. and a pressure of 1 to 60 atm. The polymerization is accompanied by stirring with the use of a fluidized bed, gravity or vibration boiling, or mechanical, vibrator and pneumatic means.

If the second component of the catalyst is vapor-deposited simultaneously with gas-phase polymerization, the filler with the transition metal compound deposited on its surface is placed in a gas-phase polymerization reactor. Vapor of an organometallic compound and a gaseous monomer are simultaneously introduced into the reactor. The polymerization is carried out as described above.

In the case of a liquid-phase deposition of the second component of the catalyst, carried out prior to liquid-phase polymerization, the filler with the transition metal compound deposited on its surface is placed in a liquid-phase polymerization reactor. An organic solvent, such as n-heptane or benzene, is introduced into the reactor, which is followed by adding a liquid organometallic compound, such as diethyl aluminium chloride, triethyl aluminium, triisobutyl aluminium, diethyl zinc, or dimethyl magnesium, which is deposited on the surface of the filler. A monomer is then introduced into the reactor to be dissolved in the organic solvent, and polymerization is carried out. The process of polymerization is accompanied by stirring. The stirring may be effected mechanically, by bubbling the gaseous monomer, or by recirculating the reaction mixture. The liquid-phase polymerization is carried out at a temperature of 50° to 100° C. and a pressure of 1 to 60 atm.

In the case of liquid-phase deposition of the second component of the catalyst on the surface of the filler, carried out simultaneously with liquid-phase polymerization, the filler with the transition metal compound deposited on its surface is placed in a liquid-phase polymerization reactor. This is followed by adding an organic solvent and a monomer soluble in the organic solvent, or a liquid monomer alone. The adding of the solvent and monomer, or of a monomer alone is accompanied by introducing a liquid organometallic compound into the reactor. This results in a practically simultaneous deposition of the second component of the catalyst and polymerization of the monomer.

All of the above embodiments of the method in accordance with the invention yield a solid filler with a polymer coating on its surface.

In the case of a liquid-phase deposition of the second component of the catalyst and liquid-phase polymerization it is necessary to dry the end product.

Drying the end product is unnecessary if the application of a polymer coating is a totally gas-phase process.

If the filler is a dispersed material, it continues to be such after being coated, with no sticking together of particles taking place.

According to the invention, one can easily vary the thickness of the polymer coating by adjusting the polymerization process parameters, such as the temperature, pressure and time. The method of this invention makes it possible to vary the polymer coating thickness within a broad range from a minimum of $7 \cdot 10^{-3}$ g/m² and obtain materials, wherein the ratio between the weights of the filler and polymer coating is variable over a broad range.

The method of this invention can be effected as both a continuous and batch process.

Of all the foregoing embodiments of the method for applying polymer coatings in accordance with the invention, the one whereby all the operations are gas-phase processes is preferable. The use of gas-phase techniques makes it possible to intensify and simplify the whole coating process.

A better understanding of the present invention will be had from a consideration of the following examples illustrating preferred embodiments thereof.

EXAMPLE 1

The filler is aluminium oxide with particle sizes of 25 to 50μ. Prior to use, the filler is dried for one hour at 120° C. and is placed in an amount of 5.5 g in a rotary metal reaction vessel of the drum drier type. The reaction vessel is evacuated, and vapor of vanadium tetrachloride is introduced into it in an amount of 0.006 g; as this takes place, the vapor of vanadium tetrachloride is deposited on the surface of the aluminium oxide particles. The vanadium tetrachloride thus deposited is fixed on the surface of the filler by being reduced to solid phase, i.e. to vanadium trichloride. The reduction is carried out at a temperature of 100° C. The aluminium oxide having vanadium chloride deposited on its surface is placed in a reactor of the above-mentioned type, maintained at a temperature of 98° C., and vapor of triisobutyl aluminium is added thereto in an amount of 0.0213 g to deposit on the surface of aluminium oxide. Ethylene is then introduced at a pressure of 10 atm into the reactor containing aluminium oxide particles with the catalyst components deposited on their surface, and gas-phase polymerization is carried out with stirring at a temperature of 98° C. during 13 minutes. The yield of polyethylene is 7.2 g.

The end product, i.e. particles of aluminium oxide with polyethylene coating, is discharged from the reaction vessel. The end product comprises 43 percent by weight of aluminium oxide and 57 percent by weight of polyethylene. The polymer coating is of a high quality, its density being 0.9 g/cm³, and is uniformly distributed over the entire surface of the filler. The coating does not peel off the surface of the filler, but, on the contrary, has a strong adhesion to that surface. The tensile strength of articles injection-molded from the end product is 360 kgf/cm².

EXAMPLE 2

The filler is aluminium oxide with particle sizes of 50 to 100μ. The filler is dried for one hour at a temperature of 120° C. and placed in a reaction vessel in an amount of 8.64 g. The reaction vessel is evacuated, whereupon vapor of vanadium tetrachloride is introduced into it in an amount of 0.0009 g to deposit on the surface of the filler. The aluminium oxide particles with vanadium tetrachloride deposited on their surfaces are maintained at a temperature of 100° C. and then transferred to a gas-phase polymerization reactor. The temperature in the latter is maintained at 98° C. Vapor of triisobutyl aluminium in an amount of 0.0023 g and a flow of ethylene are introduced into the polymerization reactor. The ethylene pressure is 44 atm. The polymerization process takes 11 minutes with a yield of polyethylene of 8.3 g.

The end product is aluminium oxide particles with a polyethylene coating. In the end product, the aluminium oxide content is 51 percent by weight and the polyethylene content is 49 percent by weight. The polyethylene coating is uniformly applied over the entire surface of each aluminium oxide particle. No peeling of the coating is observed.

EXAMPLE 3

Expanded perlite with particle sizes of 50 to 150μ is dried at a temperature of 150° C. and placed in an amount of 28 g in a reaction vessel. Vapor of titanium tetrachloride containing 0.014 g of that compound and a flow of an inert gas (nitrogen) are introduced into the reaction vessel, while the perlite particles are stirred. Vapor of diethyl aluminium chloride in an amount of 0.08 g and a flow of an inert gas are then introduced into the reaction vessel. The perlite particles with the catalyst deposited on their surfaces are then placed in a gas-phase polymerization reactor, whereto ethylene is fed at a pressure of 3 atm. The polymerization is carried out for 90 minutes at a temperature of 80° C. The yield of polyethylene is 33 g.

The end product is particles of expanded perlite with a coating of polyethylene. The product comprises 46 percent by weight of perlite and 54 percent by weight of polyethylene. The coating is uniformly applied to the entire surface of each perlite particle without peeling off the filler. The thickness of the coating is $39 \cdot 10^{-2}$ g/m². The tensile strength of sample articles molded from this product is 330 kgf/cm².

EXAMPLE 4

Sand with grain sizes of 150 to 200μ is dried and placed in an amount of 4.7 g in a reaction vessel. The reaction vessel is evacuated, and 0.0038 g of iron trichloride is deposited on the surfaces of sand grains by sublimation. The filler with iron trichloride deposited on its surface is then transferred to a gas-phase polymerization reactor, wherein the temperature is maintained at 70° C. Vapor of triethyl aluminium in an amount of 0.0037 g and a flow of ethylene are introduced into the polymerization reactor. The polymerization is carried out for 10 minutes at a pressure of 40 atm. The yield of polyethylene is 0.9 g.

The end product is grains of sand having a uniform coating of polyethylene. The product comprises 84 percent by weight of sand and 16 by weight of polyethylene. No peeling of the coating is observed.

EXAMPLE 5

Catalyst components are deposited on the surface of the filler, and polymerization is carried out as is Example 1. The filler is 6.27 g of sand with grain sizes of 10 to 150μ, dried at a temperature of 130° C. The catalyst components are vanadium tetrachloride taken in an amount of 0.0011 g and triisobutyl aluminium taken in an amount of 0.0046 g. The monomer is propylene supplied at a pressure of 4 atm. The polymerization is carried out for 100 minutes at a temperature of 92° C. The polypropylene yield is 1.6 g.

The end product is grains of sand with a coating of polypropylene. The product comprises 80 percent by weight of sand and 20 percent by weight of polypropylene. The polypropylene coating is uniformly applied to the entire surface of the filler. No peeling of the coating is observed. The density of the coating is 0.8 g/cm$^3$ and the thickness is $85 \cdot 10^{-2}$ g/m$^2$.

EXAMPLE 6

9 g of sand dried at a temperature of 130° C. is placed in a reaction vessel where 0.0047 g of vanadium tetrachloride is vapor-deposited on the surfaces of the sand grains in a flow of an inert gas and under fluidized bed conditions. The fluidized bed conditions are maintained as vapor of triisobutyl aluminium is introduced in an amount of 0.015 g into the reaction vessel. The result is simultaneous reduction and fixation of vanadium chloride on the surface of the filler and deposition of the organoaluminium. The filler with the catalyst deposited on its surface is placed in a gas-phase-polymerization reactor where polymerization of propylene is carried out for 30 minutes at a temperature of 165° C. and propylene pressure of 5 atm. The yield of polypropylene is 1.9 g.

The end product is grains of sand with a coating of polypropylene. The product comprises 82.6 percent by weight of sand and 17.4 percent by weight of polypropylene. The polypropylene coating is uniformly applied to the entire surface of the filler. No peeling of the polypropylene coating is observed. The density of the coating is 0.93 g/cm$^3$ and the thickness is $70 \cdot 10^{-2}$ g/m$^2$.

EXAMPLE 7

Catalyst components are deposited on the surface of the filler, and polymerization is carried out as in Example 2. The filler is 50 g of glass fiber with a fiber diameter of 9μ and fiber length of 3 to 5μ. The catalyst components are vanadium tetrachloride taken in an amount of 0.023 g and diisobutyl aluminium chloride taken in an amount of 0.043 g. The monomer is ethylene. The ethylene is supplied at a pressure of 20 atm. The polymerization is carried out for 30 minutes at a temperature of 98° C. The yield of polyethylene is 21 g.

The end product is glass fiber with a coating of polyethylene applied to the surface of each individual fiber. The product comprises 70.5 percent by weight of glass fiber and 29.5 percent by weight of polyethylene. The polyethylene coating is uniformly applied to the entire surface of each fiber without any peeling taking place. The density of the coating is 0.85 g/cm$^3$.

EXAMPLE 8

Expanded perlite with particle sizes of 50 to 150μ is dried and placed in an amount of 60 g in a reaction vessel. The reaction vessel is evacuated and vapor of vanadium tetrachloride containing 0.0048 g of that compound is introduced into it. Ethylene is then fed into the reaction vessel for fixing the vanadium compound on the surface of the filler by reducing it to vanadium trichloride. The particles of perlite with the transition metal compound deposited on their surfaces are transferred to a gas-phase-polymerization reactor, wherein a temperature of 50° C. is maintained. The perlite particles are continuously stirred as 0.018 g of triisobutyl aluminium is introduced with a flow of ethylene into the polymerization reactor. The deposition of the organoaluminium on the surface of the filler and polymerization of ethylene on the catalyst takes place simultaneously. The polymerization is carried out for 50 minutes at a pressure of 60 atm to yield 61 g of polyethylene.

The end product is particles of expanded perlite with a coating of polyethylene. The product comprises 49.6 percent by weight of expanded perlite and 50.4 percent by weight of polyethylene. The polyethylene coating is uniformly applied to the entire surface of the filler. No peeling of the coating is observed. The thickness is $35 \cdot 10^{-2}$ g/m$^2$. Sample articles molded from this product possess a tensile strength of 290 kgf/cm$^2$.

EXAMPLE 9

Graphite with particle sizes of 20 to 50μ is dried during 2 hours at a temperature of 200° C. and placed in an amount of 10 g in a reaction vessel. The reaction vessel is evacuated and as the graphite particles are mixed, vapor of vanadium trioxychloride in an mount of 0.012 g is introduced into it to be followed by an introduction of vapor of triisobutyl aluminium containing 0.041 g of that compound. The graphite particles with the complex organometallic catalyst deposited on their surfaces are then transferred to a gas-phase-polymerization reactor, whereto ethylene is fed to bring the pressure to 1 atm. The gas-phase polymerization is carried out for 30 minutes at a temperature of 98° C. to yield 4.5 g of the polymer.

The end product thus obtained is composed of graphite particles with a coating of polyethylene. The product comprises 69 percent by weight of graphite and 31 percent by weight of polyethylene. The polyethylene coating is uniformly applied to the entire surface of the filler without any peeling off taking place.

EXAMPLE 10

Catalyst components are deposited on the surface of the filler and the polymerization is carried out as in Example 1. The filler is 9.3 g of glass beads. The catalyst components are vanadium tetrachloride taken in an amount of 0.0056 g and triisobutyl aluminium taken in an amount of 0.019 g. The monomer is ethylene supplied at a pressure of 21 atm. The polymerization is carried out for 20 minutes at a temperature of 98° C. to yield 2.1 g of the polymer.

The end product is composed of glass beads with a coating of polyethylene. The product comprises 81.6 g percent by weight of glass beads and 18.4 percent by weight of polyethylene. The polyethylene coating is uniformly applied to the entire surface of the filler without any peeling taking place.

EXAMPLE 11

Catalyst components are deposited on the surface of the filler and the polymerization is carried out as in Example 3. The filler is expanded perlite taken in an amount of 20 g. The catalyst components are titanium tetrachloride taken in an amount of 0.015 g and diethyl zinc taken in an amount of 0.2 g. The monomer is ethylene supplied at a pressure of 4 atm. The polymerization is carried out for 120 minutes at a temperature of 70° C. The polymer yield is 12.5 g.

The end product is composed of particles of expanded perlite with a coating of polyethylene. The product comprises 61 percent by weight of expanded perlite and 39 percent by weight of polyethylene. The polyethylene coating is uniformly applied to the entire surface of the filler without any peeling taking place.

EXAMPLE 12

The surface of a steel plate 10 by 15 cm is degreased, and vapor of vanadium tetrachloride in an amount of 0.023 g is deposited on it in an atmosphere of an inert gas. Ethylene is introduced into the reaction zone to reduce the vanadium compound deposited on the surface of the steel plate. Vapor of triethyl aluminium in an amount of 0.061 g is then introduced with the flow of ethylene, and the polymerization is carried out for 30 minutes at a temperature of 110° C. and a pressure of 60 atm.

As a result, a polyethylene coating is uniformly applied to the entire surface of the steel plate. The coating has a density of 0.95 g/cm$^3$ and a thickness of $1.1 \cdot 10^3$ g/m$^2$. No peeling of the coating is observed.

EXAMPLE 13

40 g of expanded perlite with particle sizes of 50 to 150$\mu$ is dried at a temperature of 150° C. and placed in a reaction vessel. The reaction vessel is evacuated and as the perlite is stirred, vapor of vanadium tetrachloride in an amount of 0.025 g is introduced into the reaction vessel with a flow of an inert gas. The perlite particles with vanadium tetrachloride deposited on their surfaces are maintained at a temperature of 100° C. to reduce the vanadium compound to vanadium trichloride. The perlite particles with the vanadium compound deposited on their surfaces are then transferred to a liquid-phase polymerization reactor with an addition of 0.7 l of n-heptane, 100 g of α-butene and 0.1 g of triisobutyl aluminium. The polymerization is accompanied by stirring and carried out for 6 hours at a temperature of 70° C. The polymer yield is 38.3 g.

The end product is composed of particles of perlite with a coating of polybutylene. The product comprises 51 percent by weight of perlite and 49 percent by weight of polybutene. The polybutene coating is uniformly applied to the entire surface of the filler without any peeling taking place.

EXAMPLE 14

Expanded perlite is dried at a temperature of 150° C. and placed in an amount of 31 g in a reaction vessel. The latter is blown with an inert gas, and vapor of vanadium tetrachloride containing 0.004 g of that compound is introduced with the inert gas flow into the reaction vessel, which is followed by introducing ethylene. As a result, vanadium tetrachloride deposited on the surface of the filler is reduced to vanadium trichloride. The filler with the vanadium compound deposited and fixed on its surface is transferred to a liquid-phase polymerization reactor. 0.5 g of benzene and 0.02 g of triisobutyl aluminium are then added, which is followed by introducing ethylene to bring the pressure to 60 atm. The liquid-phase polymerization is carried out during 28 minutes at a temperature of 70° C. and the above-mentioned pressure, after which the end product is dried. The polymer yield is 26.1 g.

The end product is composed of particles of expanded perlite with a coating of polyethylene. The product comprises 54.3 percent by weight of perlite and 45.7 percent by weight of polyethylene. The polyethylene coating is uniformly applied to the entire surface of the filler without any peeling taking place. The coating has a density of 0.86 g/cm$^3$.

EXAMPLE 15

Catalyst components are deposited on the surface of the filler and the polymerization is carried out as in Example 14. The filler is finely pulverized barium sulfate taken in an amount of 12 g. The catalyst components are vanadium tetrachloride taken in an amount of 0.002 g and triisobutyl aluminium taken in an amount of 0.016 g, with an addition of 0.1 l of n-heptane. The monomer is ethylene supplied at a pressure of 5 atm. The polymerization is carried out for 120 minutes at a temperature of 80° C. The polymer yield is 17.9 g.

The end product is composed of particles of barium sulfate with a coating of polyethylene. The product comprises 41 percent by weight of barium sulfate and 59 percent by weight of polyethylene. The polyethylene coating is uniformly applied to the entire surface of the filler without any peeling taking place.

EXAMPLE 16

Sand with grain sizes of 150 to 200$\mu$ is dried at a temperature of 120° C. and placed in an amount of 14.2 g in a reaction vessel. The latter is evacuated, whereupon vapor of vanadium tetrachloride containing 0.018 g of that compound is introduced into the reaction vessel. Ethylene is then introduced to ensure complete fixation of the vanadium compound deposited on the surfaces of the sand grains. The sand grains with the first catalyst component deposited on their surfaces are placed in a liquid-phase polymerization reactor, whereto 0.056 g of triethyl aluminium and 120 g of liquid propylene are added. The polymerization is carried out for 3.5 hours at a temperature of 50° C. The polymer yield is 20 g.

The end product is composed of grains of sand with a coating of polypropylene. The product contains 41.5 percent by weight of sand and 58.5 percent by weight of polypropylene. The polypropylene coating is uniformly applied to the entire surface of the filler without any peeling taking place.

EXAMPLE 17

Expanded perlite is dried at a temperature of 150° C. and placed in an amount of 34 g in a reaction vessel. 0.043 g of tungsten hexachloride is deposited on the surface of the filler by sublimation. The filler with the first catalyst component deposited on its surface is placed in a liquid-polymerization reactor, whereto 0.8 l of n-hexane, 0.28 g of triethyl aluminium and ethylene are added. The polymerization is accompanied by stirring and is carried out for 6 hours at a temperature of 98° C. and ethylene pressure of 10 atm. The end product is dried. The polymer yield is 6.9 g.

The product thus obtained is composed of particles of expanded perlite with a coating of polyethylene. The end product contains 83.2 percent by weight of expanded perlite and 16.8 percent by weight of polyethylene. The polyethylene coating is uniformly applied to the entire surface of the filler without any peeling taking place.

EXAMPLE 18

Aluminium oxide with particle sizes of 50 to 100$\mu$ is dried at a temperature of 120° to 150° C. and placed in an amount of 39.8 g in a reaction vessel. The reaction vessel is evacuated and 0.031 g of titanium tetrachloride is vapor-deposited on the surface of the filler at a temperature of 100° C. The reaction vessel is then cooled to 25° C., whereupon 0.0873 g of dimethyl magnesium, 0.5 l of n-heptane and ethylene are added. The polymerization is accompanied by stirring and is carried out for 3 hours at a temperature of 80° C. and ethylene pressure of 5 atm. The end product is dried. The polymer yield is 24.9 g.

The product thus obtained is composed of particles of aluminium oxide with a coating of polyethylene. The product comprises 61.5 percent by weight of aluminium oxide and 38.5 percent by weight of polyethylene. The polyethylene coating is uniformly applied to the entire surface of the filler without any peeling taking place.

EXAMPLE 19

Iron oxide with a particle size of about 0.1$\mu$ is dried at a temperature of 100° C. and placed in an amount of 12.6 g in a reaction vessel. The latter is evacuated and as the filler is stirred, vapor of vanadium tetrachloride containing 0.0011 g of that compound is introduced into the reaction vessel with a flow of an inert gas. Ethylene is then introduced to reduce and fix the vanadium compound deposited on the surface of the filler. The filler is then transferred to a liquid-phase polymerization reactor, whereto 0.1 l of n-heptane and 0.0053 g of triisobutyl aluminium are added and ethylene is introduced to bring the pressure to 1.2 atm. The polymerization is carried out for 50 minutes at a temperature of 80° C. The end product is dried. The polymer yield is 1.1 g.

The product thus obtained is composed of iron oxide particles with a coating of polyethylene. The product contains 92 percent by weight of iron oxide and 8 percent by weight of polyethylene. No sticking together of particles occurs, the polyethylene coating being uniformly applied to the entire surface of the filler. No peeling of the coating off the filler surface is observed.

What is claimed is:

1. A method for applying a polymer coating onto the surface of a solid filler comprising the steps of depositing a complex organometallic catalyst on the surface of the filler in two separate stages, the first stage comprising the step of depositing, in the gas phase, a compound of a transition metal on the surface of the filler whereby the transition metal compound becomes fixed to the surface of the filler and the second stage comprising the step of depositing, in the gas phase, an organic compound of a metal selected from the second or third groups of the periodic system on the resulting surface of the filler; and polymerizing an olefin in the gas phase at a temperature of from about 50° to 170° C. and a pressure of from about 1 to 60 atm on the catalyst deposited on the surface of the filler.

2. The method of claim 1, wherein the second state of the deposition step is carried out simultaneously with the polymerization step.

3. The method of claim 1, wherein the catalyst components are deposited on the surface of the filler prior to carrying out the polymerization step.

4. The method of claim 1, wherein the filler is a material selected from the group consisting of aluminum oxide, expanded perlite, sand, graphite, fiber glass, glass beads and steel.

5. A method for applying a polymer coating onto the surface of a solid filler comprising the steps of depositing a complex organometallic catalyst on the surface of the filler in two separate stages, the first stage comprising the step of depositing, in the gas phase, a compound of a transition metal on the surface of the filler, whereby the transition metal compound becomes fixed to the surface of the filler and the second stage comprising the step of depositing, in the liquid phase, an organic compound of a metal selected from the second or third groups of the periodic system on the resulting surface of the filler; and polymerizing an olefin, in the liquid phase, at a temperature of from about 50° to 100° C. and a pressure of from about 1 to 60 atm on the catalyst deposited on the surface of the filler.

6. The method of claim 5, wherein the second stage of the deposition step is carried out simultaneously with the polymerization step.

7. The method of claim 5, wherein the transition metal compound is selected from the group consisting of vanadium tetrachloride, vanadium oxytrichloride, titanium tetrachloride, tungsten hexachloride, and iron trichloride, and the organic compound is selected from the group consisting of diethyl aluminum chloride, triethyl aluminum, triisobutyl aluminum, diethyl zinc, and diethyl magnesium.

8. The method of claim 5, wherein the amount of the transition metal compound deposited on the surface of the filler is 0.001 to 0.1 percent of the weight of the filler.

9. The method of claim 7, wherein the liquid-phase polymerization is conducted simultaneously with the second catalyst deposition stage by mixing the filler coated with the transition metal compound with an organic solvent selected from the group consisting of n-heptane and benzene, adding the organic compound of a metal selected from the second or third groups of the periodic system to the mixture, introducing a monomer into the mixture, and then conducting the polymerization step.

10. The method of claim 5, wherein the filler is a material selected from the group consisting of aluminum oxide, iron oxide, barium sulfate, sand and expanded perlite.

* * * * *